Oct. 27, 1959    K. A. BOLMEYER    2,910,577
VEHICLE HEADLAMP MOUNTING
Filed March 15, 1957
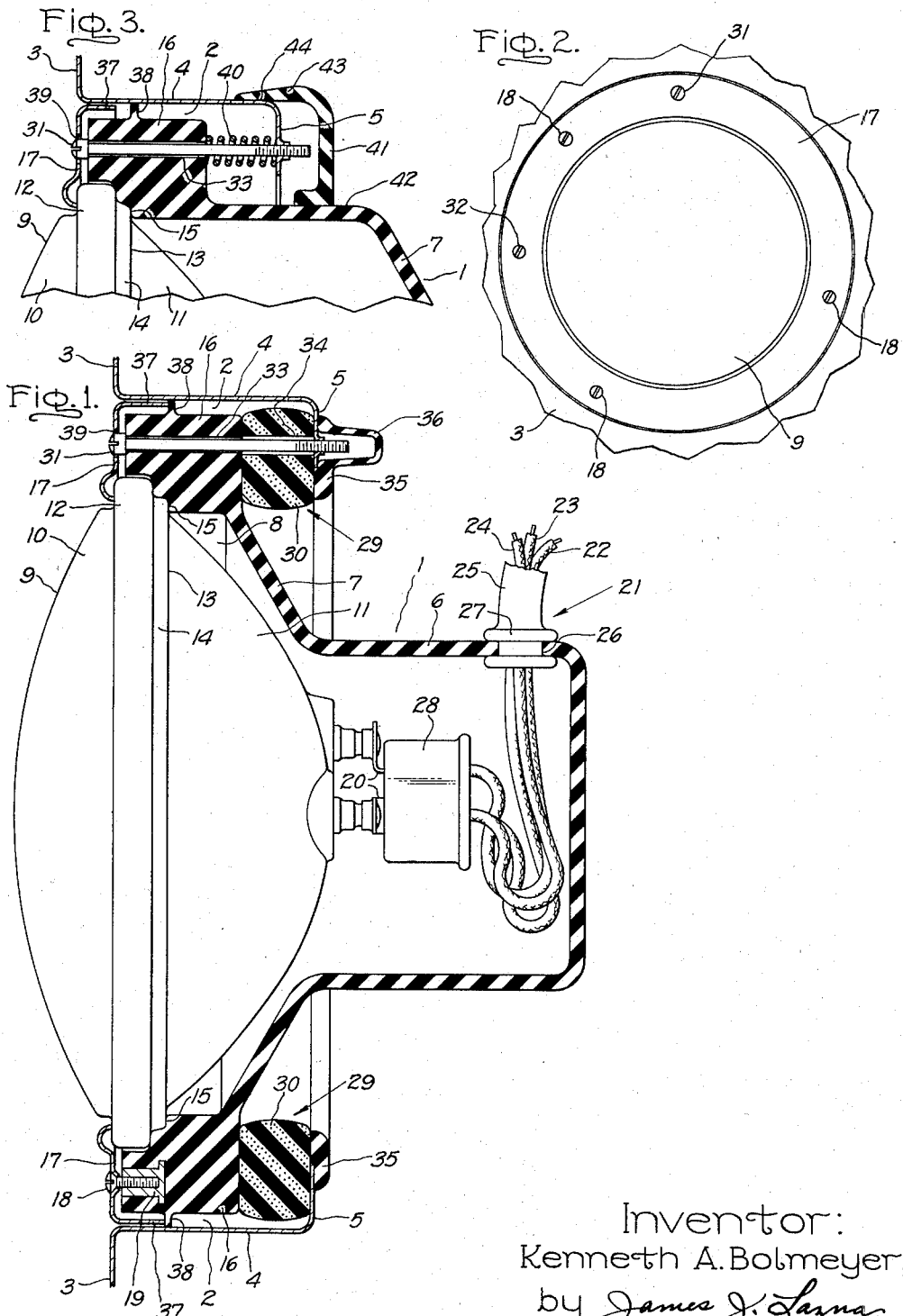
Inventor:
Kenneth A. Bolmeyer,
by James J. Lazna
His Attorney.

United States Patent Office 2,910,577
Patented Oct. 27, 1959

2,910,577

VEHICLE HEADLAMP MOUNTING

Kenneth A. Bolmeyer, Euclid, Ohio, assignor to General Electric Company, a corporation of New York Application March 15, 1957, Serial No. 646,302

1 Claim. (Cl. 240—41.6)

This invention relates to mounting arrangements for securing unitary headlamp assemblies or units on automotive vehicles, and more particularly to a mounting arrangement of the adjustable type for permitting a limited amount of angular adjustment of the optical axis of the headlamp unit both vertically and horizontally for lamp aiming purposes.

The lamp units commonly used in automobile headlamps at the present time comprise a reflector, lens and light source sealed as a unit to prevent the entrance of dust and moisture which reduce the efficiency of the reflector. Such reflector-type lamp units are commonly referred to as sealed beam lamps and are of the general construction disclosed in U.S. Patent 2,148,314, Wright, issued February 21, 1939 and assigned to the assignee of the present invention.

In mounting arrangements for headlamp units for use in automobiles and other vehicles, it is customary practice to provide means for angularly adjusting the optical axis of the lamp unit both vertically and horizontally in order to permit proper aiming of the headlamp unit. The prior headlamp mounting arrangements of such aimable type, however, have generally been of rather complicated construction and have utilized a considerable number of parts and a considerable content of metal such as renders the lamp mounting an expensive cost item.

It is an object of my invention, therefore, to provide a vehicle headlamp mounting arrangement of the aimable type which is simple in construction and relatively inexpensive and having equal quality and performance to that of prior mounting arrangements.

Another object of my invention is to provide a vehicle headlamp mounting arrangement of the aimable type which utilizes a minimum number of parts and is characterized by relatively low metal content.

Still another object of my invention is to provide a vehicle headlamp mounting arrangement of the aimable type possessing improved shock and vibration absorption characteristics as compared to that of prior mounting arrangements.

Briefly stated, in accordance with one aspect of the invention, the sealed beam lamp unit is fixedly mounted in place in a one piece body or housing member molded of rubber or pliable synthetic material and having an open end within which the lamp unit is positioned and fixedly held in place, against a lamp seating surface located on the housing member adjacent its open end, by means of a lamp retaining ring member. The housing member is supported in place, within an opening in the support member or fender of the vehicle, by yieldable support means comprising a sponge type compression ring of sponge rubber or other like material against which the housing member is seated and held, the ring being compressible in the direction of the axis of the lamp unit mounted in the housing member to provide a limited amount of rocking adjustment movement of the housing member relative to the support member for lamp aiming purposes. Adjustable fastening means connecting the support and housing members at spaced points around the annular extent of the open end of the housing member, provide for adjusting the position of the housing member and the associated lamp unit relative to the support member to thereby obtain proper aiming of the headlamp.

According to a further aspect of the invention, the yieldable support means may comprise a series of compression coil springs extending in the direction of the axis of the housing member and the lamp unit mounted therein and compressed between the support member and the housing member at points spaced around the annular extent of the said member. The adjustable fastener means interconnect the support and housing members at two points spaced approximately 90° apart around the annular extent of the housing member to provide for rocking adjustment movement of the housing member and the associated lamp unit in intersecting planes normal to each other and passing through the axis of the housing member and the lamp unit mounted therein.

Further objects and advantages of my invention will appear from the following detailed description of species thereof and from the accompanying drawing.

In the drawing,

Fig. 1 is a vertical sectional view through a vehicle headlamp mounting arrangement comprising my invention, with the associated sealed beam lamp unit shown in elevation.

Fig. 2 is a fragmentary front elevation of the headlamp mounting arrangement, and Fig. 3 is a fragmentary vertical sectional view through a modified form of vehicle headlamp mounting arrangement comprising my invention.

Referring to the drawings, the headlamp mounting arrangement therein illustrated comprises a body or housing member 1 adapted for recessed mounting in an opening or well 2 in a lamp support member 3 such as a fender or body panel of a vehicle. The opening 2 may be formed by punching and drawing the metal of the fender to form a short inwardly extending tubular or cylindrical wall 4 terminating at its inner end in an inturned annular seating flange 5. The housing member 1 is molded of rubber or pliable synthetic material and it is of more or less cup shape comprising a cylindrical inner portion 6 and an outwardly extending annular outer flange portion 7 terminating in an open end 8 within which a lamp unit 9 is mounted and fixedly secured to the housing member. The lamp unit 9 may be of the all glass sealed beam type such as is commonly employed for automotive headlamps at present and comprising a glass lens section 10 and a glass reflector section 11 fusion sealed together to form the lamp envelope or bulb within which a light source or filament (not shown) is sealed. The lamp unit 9 is provided around its rim with an outwardly extending annular flange 12 formed on its back side either with a continuous lamp seating surface 13 as shown, or with a series of spaced seating surfaces 13 disposed in a plane transverse to the optical axis of the lamp unit, the said seating surface or surfaces 13 being afforded by either a continuous annular ledge or shoulder 14 formed on the back side of the flange 12 as shown, or by a group of three or more seating pads formed on the back side of the flange 12 and spaced around the annular extent thereof.

The housing member 1 is provided with an annular lamp seating means or mounting surface 15 which extends around the periphery of its outer flange portion 7 and on which the seating surface or surfaces 13 of the lamp unit 9 are adapted to seat to properly mount the lamp unit in position within the housing member. As shown, the lamp seating means or mounting surface 15 may be constituted by an annular shoulder or ledge formed in the inner side wall of a relatively thick-sectioned peripheral collar or rim 16 on the flange portion 7 of the housing member 1. The lamp unit 9 is secured in place within the housing member 1, in seated position on the mounting shoulder 15 thereof, by means of a combination lamp retainer and trim ring 17 which fits over and is clamped against the outer side of the flange 12 on the lamp unit in a suitable manner, as by means of a plurality (three in the particular case illustrated) of lamp retainer screws 18 spaced around the annular extent of the retainer ring 17 as indicated in Fig. 2, and having screw-threaded engagement with metal insert bushings 19 molded into the rim 16 of the flange portion 7 of the housing member 1. The electrical circuit connections to the contact terminals 20 of the lamp unit 9 may be provided by a wiring harness 21 consisting of the customary three current-carrying conductors 22, 23 and 24 enclosed within and extending through a rubber enclosure tube 25 which is fastened at one end within an opening 26 in the wall of the inner portion 6 of the housing member 1 by means of a grommet portion 27 formed on the enclosure tube. The conductors 22, 23 and 24 extend through the enclosure tube 25 and into the interior of the housing member 1 where they terminate in a connector socket member 28 which is adapted to be plugged onto the contact terminals or prongs 20 of the lamp unit 9 to effect the electrical connection of the lamp unit into the electrical operating circuit therefor.

The housing member 1 is supported around the peripheral outer rim 16 of its outer flange portion 7, on the support member 3 around the inturned flange 5 of the well 2 therein, by support means 29 which, in accordance with the invention, is constituted of a compression ring 30 of sponge-type resilient material, such as sponge rubber for instance, which is yieldable in the direction of the axis of the opening 2 in the support member 3 to permit a limited amount of rocking adjustment movement of the housing member 1 relative to the support member 3 in intersecting axial planes of the housing member disposed normal to one another, i.e., in both the vertical and horizontal axial planes of the housing member 1 and the lamp unit 9 secured therein. The housing member 1 is suitably secured to the support member 3, with the peripheral rim 16 of the housing member seated and clamped against the compression ring 30, as by means of a pair of aiming screws 31 and 32 and one or more mounting screws (not shown) similar to the aiming screws, the said aiming and mounting screws extending through openings 33 and 34 in the housing rim 16 and the compression ring 30, respectively, and into screw-thread engagement with the inturned flange 5 on the support member 3. The aiming screws 31 and 32 serve as adjustment fastener means for adjusting and holding the housing member 1 and the associated lamp unit 9 in the desired lamp aiming position within the support member 3. As shown, the aiming screws 31, 32 interconnect the housing and support members 1 and 3 at points spaced approximately 90° apart around their annular extent, e.g., at the top and at the left hand side thereof as viewed from the front of the headlamp. Because of the yieldability afforded by the sponge type compression ring 30, rotation of the aiming screws 31, 32 will operate to move either the top region or the left hand side region of the rim 16 of the housing member either toward or away from the flange 5 of the support member 3, depending upon which aiming screw is turned and the direction of turning movement thereof. The lamp unit 9 is thereby adjusted to the desired aimed position relative to the support member 3, the top aiming screw 31 controlling the vertical aiming of the light beam projected by the lamp and the side aiming screw 32 controlling the horizontal or lateral aiming of the light beam.

The compression ring 30 may be supported in place on the flange 5 of the support member 3 by means of a molded rubber grommet ring 35 suitably bonded or secured to the backside of the compression ring and adapted to fit tightly over and around the rim of the flanges 5 so as to firmly hold the compression ring in place seated against the support flange 5. The grommet ring 35 is preferably formed with integral molded caps or nipples 36 which accommodate and protect the portions of the aiming screws 31, 32 and the housing member mounting screws which protrude beyond the backside of the flange 5. Likewise, to protect and seal the interior of the housing member 1 against the ingress of dust, dirt, moisture and other foreign material, the lamp retainer ring 17 is provided with an inturned flange 37 which fits over the rim 16 of the housing member 1 into the space between the said housing rim 16 and the tubular side wall 4 of the lamp-receiving opening 2 in the support member 3, and abuts against a thin outward flange 38 which is formed on the outer periphery of the housing rim 16 and snugly fits within the tubular side wall 4 of the opening 2. To provide ready access to the aiming screws 31, 32 for lamp adjustment purposes, the lamp retainer ring 17 is provided with openings 39 through which the heads of the aiming screws project as shown, or through which a suitable tool can be inserted for adjusting the aiming screws.

In mounting the housing member 1 on the support member 3 of the particular headlamp mounting arrangement illustrated, the aiming screws 31, 32 and the mounting screws which hold and clamp the housing member against the compression ring 30 are tightened to an extent just sufficient to seat the housing member firmly against the compression ring and locate it in a position such that the angularity of the optical axis of the lamp unit 9 mounted in the housing is at or slightly below the lowermost extreme of the desired range of vertical angularity adjustment for the lamp unit and at or slightly beyond the left hand extreme (as viewed from behind the headlamp) of the desired range of horizontal annularity adjustment for the lamp unit. Thereafter, by further tightening and adjustment of the two aiming screws 31, 32, the housing member 1 and the associated lamp unit 9 can be adjusted to the final desired aimed position relative to the support member 3.

Instead of fastening the housing member 1 to or against the compression ring 30 by means of the aforementioned mounting screws, it may be secured to the compression ring by being suitably bonded thereto in a manner, for example, similar to the bonding of the grommet ring 35 to the compression ring 30. The lamp aiming screws 31, 32 in such case merely serve as the means for adjusting the position of the housing member and the associated lamp unit 9 to the desired lamp aiming position.

In the modified form of mounting arrangement shown in Fig. 3, the resilient back support means 29 for the housing member 1 is comprised of a plurality of compression coil springs 40 which are fitted over the respective aiming screws 31, 32 and housing mounting screws and are compressed between the flange 5 on the support member 3 and the back side of the rim 16 on the housing flange 7. The aiming screws 31, 32 and the housing mounting screws are protected from dirt, moisture, etc., by a molded rubber cover ring 41 which is circumposed about and suitably bonded or secured to a cylindrical wall portion 42 formed on the housing member 1 at the periphery of its flange 7 and encloses the portion of the said aiming and mounting screws which protrude beyond the back side of the flange 5 on the support member 3. The cover ring 41 is formed with an annular flange portion 43 which fits over and has a close sliding fit with the outer side of the annular side wall 4 of the opening 2 in the support member 3, as indicated at 44.

From the above description, it will be apparent that I have provided a vehicle headlamp mounting arrangement of the adjustable type for lamp aiming, which is of simple and inexpensive construction and incorporates a minimum content of metal. Moreover, in addition to affording a means for adjusting the aiming position of the lamp unit 9 mounted therein, the housing member 1, because of its formation out of rubber or pliable synthetic material also affords a certain degree of resistance to shock or vibration such as serves to protect the lamp unit 9 and the relatively fragile filament therein against damage or breakage.

Although a preferred embodiment of my invention has been disclosed, it will be understood that the invention is not to be limited to the specific construction and arrangement of parts shown, but that they may be widely modified within the spirit and scope of my invention as defined by the appended claim.

What I claim as new and desire to secure by United States Letters Patent is:

A vehicle headlight assembly comprising, in combination, a rigid support member having an opening therein to receive a reflector-type lamp unit, a lamp-receiving housing member of molded rubber secured to said support member within the said opening therein, said housing member having an open end and an outward annular flange terminating at the open end of said housing member, lamp seating means on said housing member for po-positioning the lamp unit therein with the axis of its reflector extending in the direction of the axis of said opening, lamp retainer means securing said lamp unit within said housing member in seated position on the said seating means thereof, support means yieldingly supporting said housing member, around the periphery of its said flange, on the said support member around the rim of the opening therein to provide a limited amount of rocking adjustment movement of the housing member relative to said support member, said support means comprising a compression ring of sponge rubber compressed between said support member and said flange on said housing member, and fastener means holding said housing member firmly seated against said compression ring and said compression ring seated against said support member, said fastener means including a pair of adjustment screw fastener means interconnecting said support and housing members at points spaced approximately 90° apart around the annular extent of the said flange on said housing member and having screw-threaded engagement with said support member for adjusting the position of said housing member relative to said support member.

References Cited in the file of this patent

UNITED STATES PATENTS

| | | |
|---|---|---|
| 2,050,724 | Mead et al. | Aug. 11, 1936 |
| 2,225,981 | Casson | Dec. 24, 1940 |
| 2,800,578 | Falge | July 23, 1957 |
| 2,824,214 | Bertsche | Feb. 18, 1958 |